US010279275B1

(12) United States Patent
Montany

(10) Patent No.: US 10,279,275 B1
(45) Date of Patent: May 7, 2019

(54) DELAYED GRATIFICATION ENCOURAGEMENT TOY

(71) Applicant: Nicholas Montany, Poughkeepsie, NY (US)

(72) Inventor: Nicholas Montany, Poughkeepsie, NY (US)

( * ) Notice: Subject to any disclaimer, the term of this patent is extended or adjusted under 35 U.S.C. 154(b) by 308 days.

(21) Appl. No.: 15/393,944

(22) Filed: Dec. 29, 2016

(51) Int. Cl.
*A63H 3/02* (2006.01)
*A63H 3/00* (2006.01)
*G09B 5/00* (2006.01)
*G09B 19/00* (2006.01)

(52) U.S. Cl.
CPC ............ *A63H 3/005* (2013.01); *A63H 3/02* (2013.01); *G09B 5/00* (2013.01); *G09B 19/00* (2013.01); *A63H 2200/00* (2013.01)

(58) Field of Classification Search
CPC ........ G09B 19/00; G09B 7/00; A63H 33/006; A63H 3/003; A63H 3/005
See application file for complete search history.

(56) References Cited

U.S. PATENT DOCUMENTS

| | | | | |
|---|---|---|---|---|
| 5,651,475 | A | * | 7/1997 | Fenton ................... A63H 3/003 221/24 |
| 6,273,027 | B1 | * | 8/2001 | Watson ................... A01K 15/02 119/712 |
| 8,430,671 | B2 | | 4/2013 | Kotler et al. |
| 8,662,898 | B2 | | 3/2014 | Bellontine |
| 8,740,623 | B2 | | 6/2014 | Walker et al. |
| 9,697,685 | B1 | * | 7/2017 | Al-Saleh ............. G07F 17/3253 |
| 2005/0095948 | A1 | | 5/2005 | Snyder et al. |
| 2009/0068625 | A1 | | 3/2009 | Petro et al. |
| 2012/0251988 | A1 | * | 10/2012 | Moffatt ................... G09B 19/00 434/236 |

FOREIGN PATENT DOCUMENTS

WO        WO2007047965        4/2007

* cited by examiner

*Primary Examiner* — Jerry-Daryl Fletcher
(74) *Attorney, Agent, or Firm* — Goldstein Law Offices, P.C.

(57) ABSTRACT

A delayed gratification encouragement toy, provided in a housing having a reservoir for holding a plurality of snack items, a receiving cup having a transparent door, and an activity device. The child engages with the activity device until a milestone is reached. A reward of at least one snack item is dispensed to the child. If the child continues to engage with the activity device without retrieving the reward, additional rewards are dispensed and will increase significantly according to how long the child is willing to delay receiving the rewards.

16 Claims, 11 Drawing Sheets

DELAYED GRATIFICATION ENCOURAGEMENT TOY

TECHNICAL FIELD

The present disclosure relates generally to a plush toy that provides an activity for a child and provides reward delivery to the child when playing the activity. More particularly, the present disclosure relates to a system for encouraging delayed gratification by encouraging the child to delay receipt of the reward.

BACKGROUND

It has become a well-established principle that an essential key to success is the ability to focus and persist through unpleasant or unexciting tasks for the sake of a future reward. The ability to sustain attention for prolonged periods of time is essential to not only school work, but also productivity in the workplace, health and fitness, and even success in relationships.

Much of our understanding of the importance of delayed gratification stems from the now famous Stanford University "marshmallow study" that was initially conducted in the 1960s, and has been repeated numerous times since. The study and subsequent studies tested the relationships between the children's ability to delay gratification with their future success—in scholastic, work, and personal arenas. In the experiment, children were offered a treat that they could receive immediately, but told that they would receive an additional treat if they could wait. After being left alone for a period of time with their treat, they would be rewarded an additional treat if they could withstand the temptation to eat the initial treat immediately. Tracking these children over time and evaluating various parameters of life success, it was found that the longer children were able to delay gratification during the study, the greater tendency for them to excel in the measured parameters of life success.

In view of the marshmallow test and both studies and anecdotal evidence and observations that corroborate the results, psychologists, behavioral scientists, and even performance specialists agree that the principle of "delayed gratification" may be among one of the most important skills or habits for achieving personal goals of any kind.

Training a person to delay gratification requires overcoming or repressing a natural impulse in the frontal cortex to respond to an immediately available reward in favor of a better future outcome. Like any other impulse, the tendency to go for the here and now would naturally dominate, in the absence of intervention. Just like other impulses, however, with intervention and training it is very possible to overcome this tendency. Successfully overcoming this impulse and reinforcing the accomplishment of delaying gratification can form a new habit that will then dominate, and lead to good results throughout life. Habits such as doing homework before going out to play will seem natural and desirable. Eating well and exercise for the sake of intangible future goals like fitness and health will be the norm. Later it may translate into a strong willingness to pay career dues or go through extensive professional training, for the sake of success. In everyday life, it may translate into a consistent ability to focus attention on work productivity whenever needed.

Just as the initial marshmallow experiment was conducted among four to six year old children, it is clear that these habits form early. Clearly then, the time to intervene and retrain impulses and create positive habits, is at a young age.

Since young children do a great deal of their learning using toys, using a toy to train behavior modification is an appropriate way to generate new positive habits and skills. Various toys and systems have been proposed by others that seek to strengthen the work/reward or behavior/reward connections, but do not reinforce the value of and habits of delayed gratification. While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a system for training a child to sustain attention and delay gratification. Accordingly, the present disclosure describes a toy that provides at least one activity to engage the child. Engaging with the activity results in offering the child a reward, and offering an additional reward if the child can wait before receiving the reward.

It is another aspect of an example embodiment in the present disclosure to provide a system that automatically dispenses a reward. Accordingly, the toy contains a reward reservoir, a receiving cup, and a dispensing mechanism for controlled dispensing of edible rewards from the reward reservoir to the receiving cup. The receiving cup has a door lock and/or door sensor for selectively preventing access to the rewards in the receiving cup and/or detecting when the child has retrieved the reward.

It is yet another aspect of an example embodiment in the present disclosure to provide a toy that is familiar and friendly to a young child, and is easy to use. Accordingly, the system may be provided as a plush toy, and the activity provided on a touch screen having tablet-like interactivity. A variety of learning activities can be provided through software to engage the child, determine a reward, prompt the child to choose to delay receipt of the reward, and to regulate dispensing of the reward by controlling the dispensing mechanism.

Accordingly, the present disclosure describes a delayed gratification encouragement toy, provided in a housing having a reservoir for holding a plurality of snack items, a receiving cup having a transparent door, and an activity device. The child engages with the activity device until a milestone is reached. A reward of at least one snack item is dispensed to the child. If the child continues to engage with the activity device without retrieving the reward, additional rewards are dispensed and will increase significantly according to how long the child is willing to delay receiving the rewards.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 1:
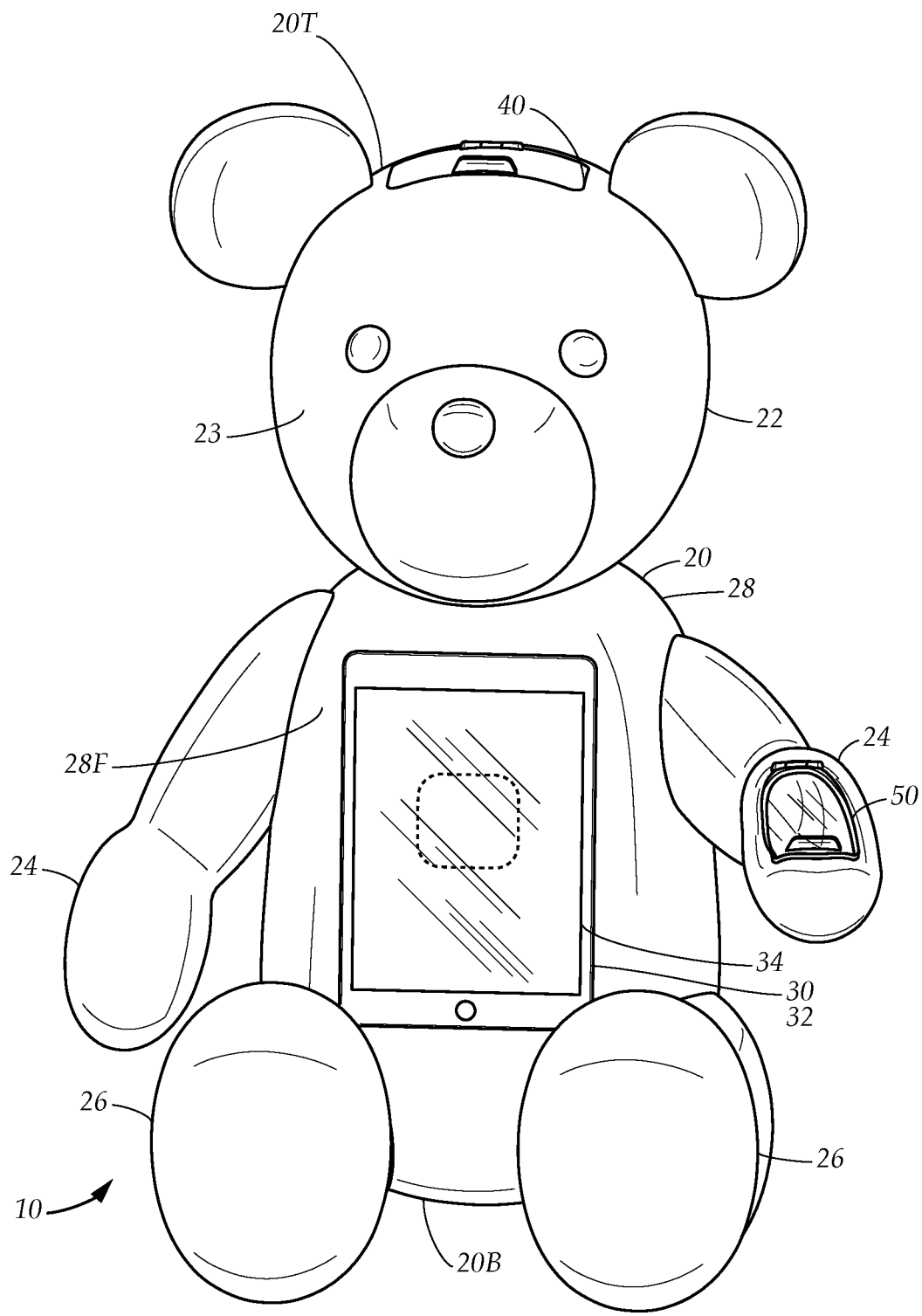
FIG. 1 is diagrammatic perspective view, illustrating an embodiment of a delayed gratification encouragement toy in accordance with the present disclosure, incorporated within a plush toy and having a touchscreen device integrated therein.

FIG. 1 illustrates a delayed gratification encouragement toy 10 for use by a child, having a housing 20, an activity device 30, a reward reservoir 40, and a receiving cup 50. Note that in the embodiment shown the housing 20 is configured as a plush toy in the shape of a bear, having a top 20T, a bottom 20B, a head 22 having a face 23, a pair of upper paws 24, a pair of lower paws 26, and a torso 28 having a torso front surface 28F. Also in the embodiment shown, the activity device 30 is located on the torso front surface 28F and is a tablet device 32 having a touchscreen display 34.

The activity device 30 provides at least one activity, suitable for engaging and occupying a child. The activity may be structured to include or provide a milestone, which may represent the completion of a game or lesson, the solving of a problem, or any other event for which it would seem appropriate to reward the child for their engagement with the activity device 30. While it is preferred that the milestone is an active event or achievement, the milestone may be a period of time of continued engagement with the activity device. Preferably the activity device 30 provides more than one activity, which may be selected by the child, by the caregiver, or dynamically according to the age, maturity, learning style, and progress of the child. When the tablet device 32 serves as the activity device 30, numerous activities may be provided through apps and programming, utilizing the same touchscreen display 34. Such apps and programming may be pre-installed and may be customized and updated through software downloaded over the Internet. The tablet device 32 is capable of displaying text and images, including but not limited to videos and animation, to facilitate providing the activity. The tablet device 32 preferably also has a speaker so that it is capable of generating sound, including music and voice prompts—making it easier to use by children that cannot read or cannot see the touchscreen display 34. The tablet device 32 may also have a microphone and be capable of voice recognition, such that various activities may be commanded using the touchscreen display 34, and also using voice commands.

Figure 4:
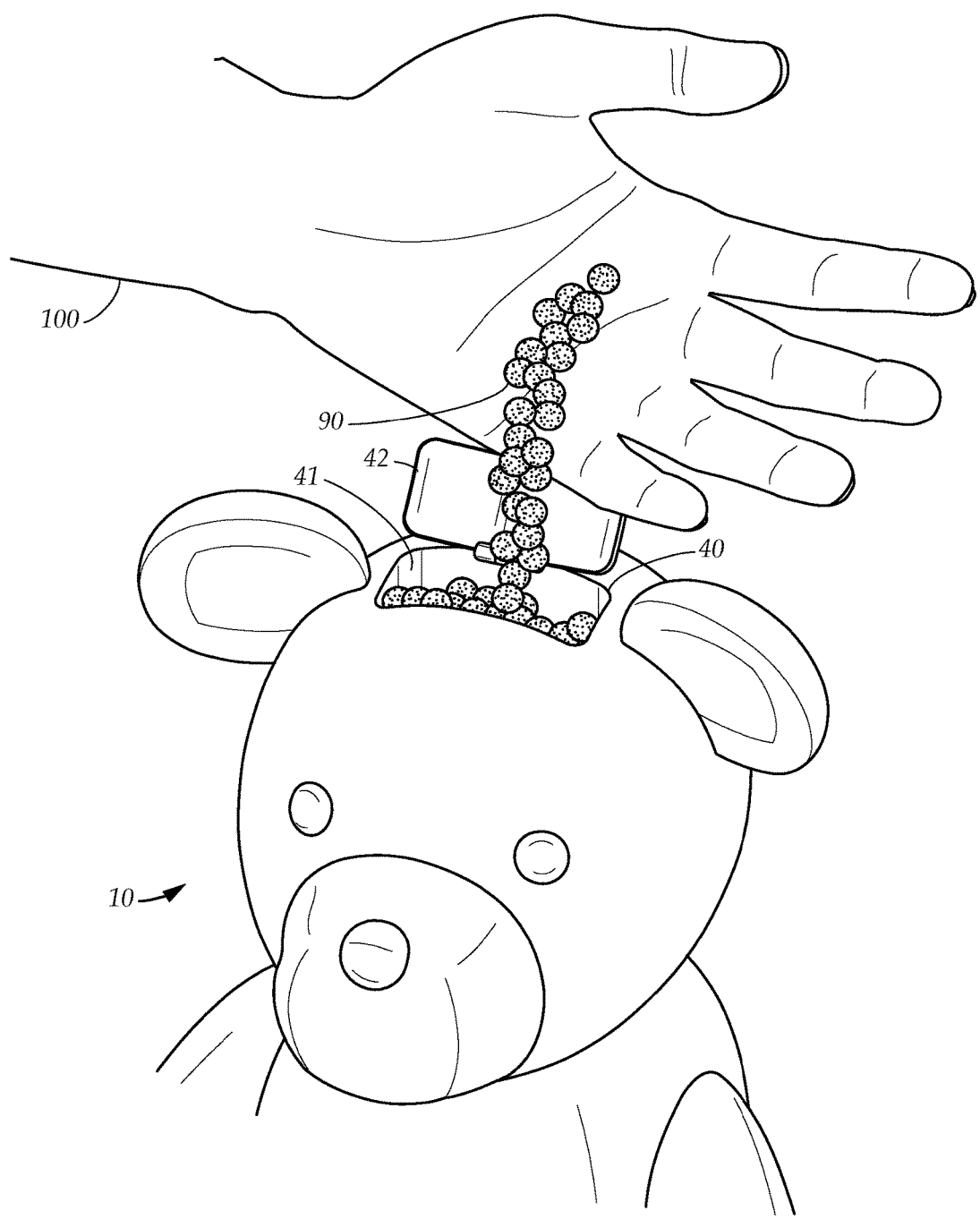
FIG. 4 is a diagrammatic perspective view, illustrating the reward reservoir being filled with edible treats.

FIG. 4 illustrates the reward reservoir 40 as it is being filled with reward items 90 by a caregiver 100. The reward items 90 are preferably small, edible treats that would be of interest to the child. Within a certain range of parameters of sizes, weights, and textures acceptable to the toy 10 and its mechanisms, the precise edible treat may be determined by the caregiver 100. The reward reservoir 40 includes a vessel 41 for holding a sufficient quantity of reward items 90, and a cover 42 for selectively providing access to the vessel 41 by the caregiver while preventing access to the vessel 41 by the child. Accordingly, the cover 42 may be configured to lock in a variety of ways, such as with a key lock that requires a key for access; a screw that requires a screwdriver to open; or an electronic lock that requires a code or signal to be entered by the caregiver 100 or generated by an electronic device of the caregiver 100 to open.

Figure 7:
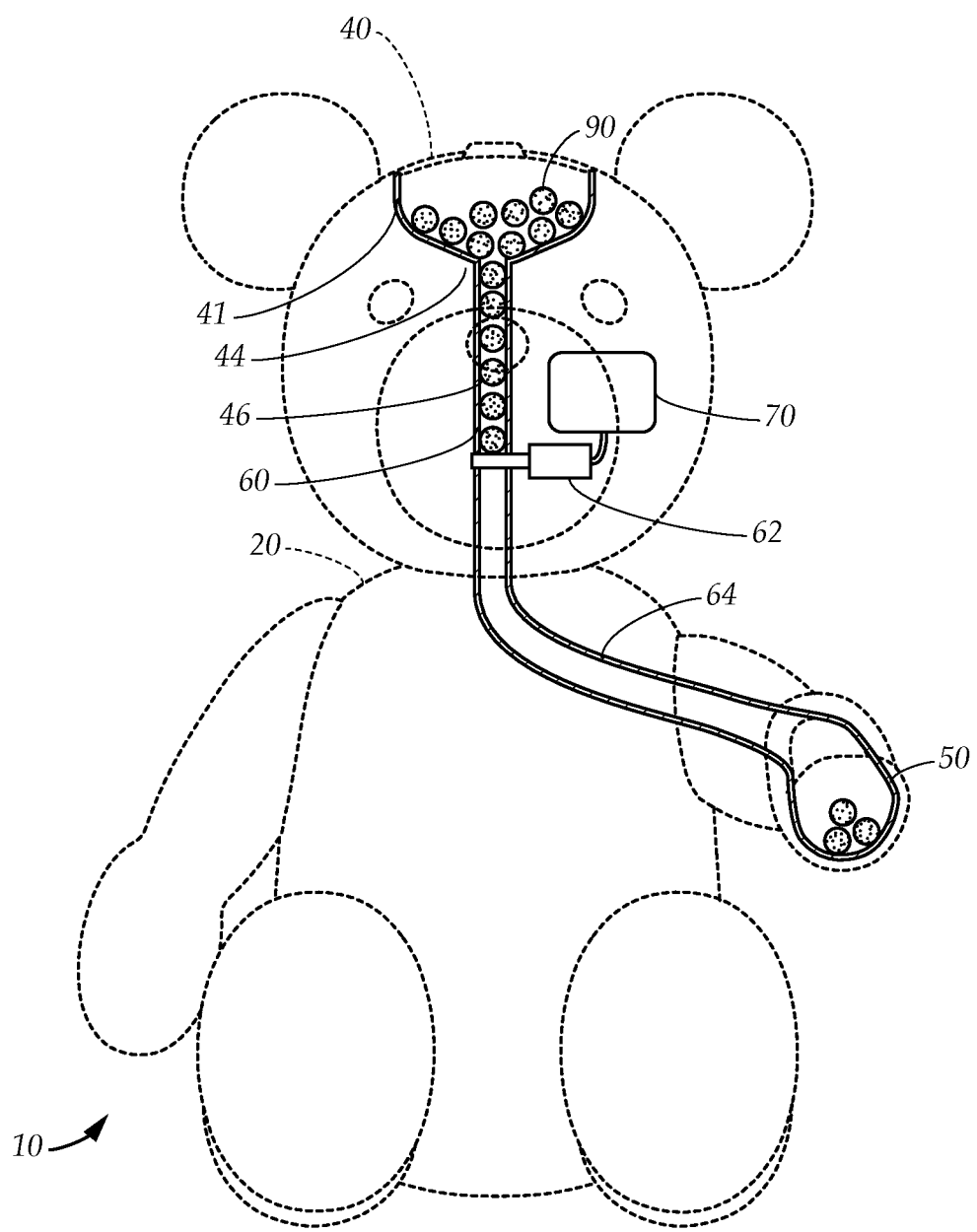
FIG. 7 is a front elevational view, diagrammatically illustrating an example of mechanisms for storing and dispensing rewards within the toy.

Referring to FIG. 7, inside the housing 20, a dispensing mechanism 60 facilitates the controlled dispensing of reward items 90 from the reward reservoir 40 to the receiving cup 50. In the example mechanism illustrated, the vessel 41 has an exit opening 44 connected to a queue tube 46. The queue tube 46 ensures a constant supply of reward items 90 to a release device 62. A delivery tube 64 connects the release device 62 with the receiving cup 50. On command, the release device 62 allows a single reward item 90 from the queue tube 46 to enter the delivery tube 64 whereupon gravity carries it downwardly to the receiving cup 50. Note that the details of such mechanisms are well known in vending machines and related arts and thus are beyond the scope of the present discussion.

Figure 2:
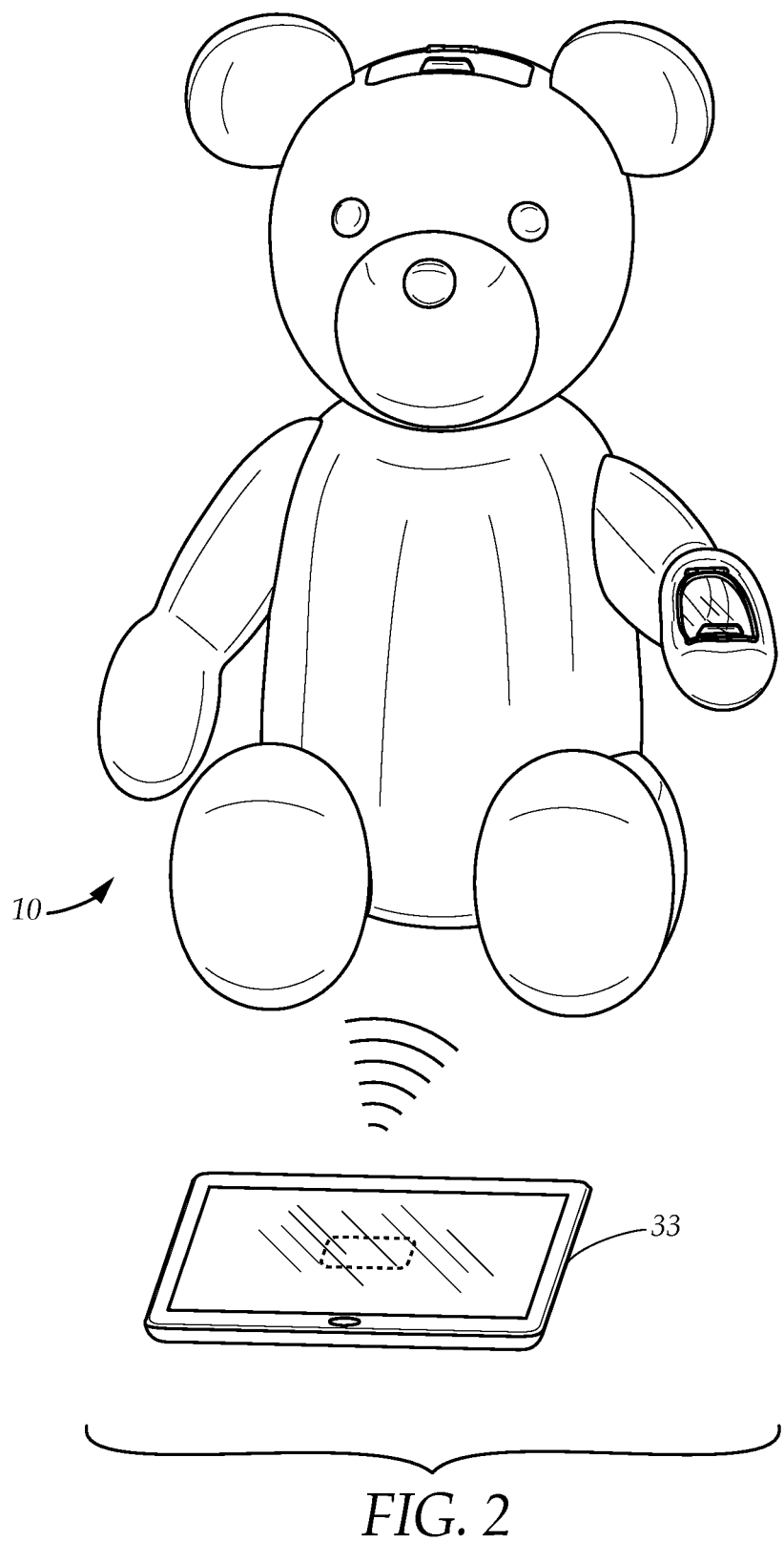
FIG. 2 is a diagrammatic perspective view, illustrating another embodiment of a delayed gratification encouragement toy, configured to work in conjunction with a tablet device.
Figure 8:
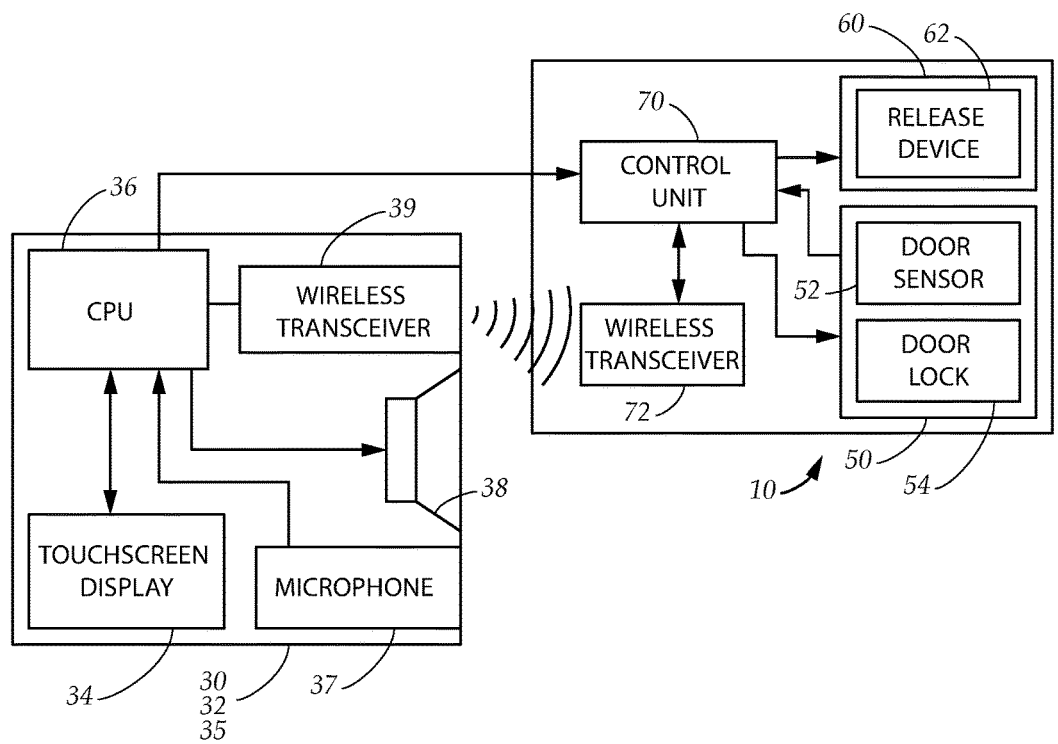
FIG. 8 is a block diagram, illustrating functional interconnection of various components of the toy.

The release device 62 operates under the control of a control unit 70. The control unit 70 is a microprocessor or microcontroller based system having logic and communication attributes and capabilities necessary for carrying out the functionality of the system as described herein. Note that the design and implementation of such control systems is well known and thus not described in detail herein. FIG. 8, however, provides an example of major functional components of the toy 10. Key to the functionality of the toy 10 is for the control unit 70 to interface with the activity device to determine when to actuate the release device 62 to dispense a reward—and if appropriate according to the configuration of the device—to release the rewards to the child or to detect retrieval of the reward by the child. Also key to the functionality of the control unit 70 is the ability to communicate with the activity device 30 to determine when an activity has been completed. This communication with the activity device 30 may be by a wired connection as illustrated. In addition, the toy 10 may also have a wireless transceiver 72, connected to the control unit 70 for communicating with the activity device 30 via any suitable communication protocol, such as WiFi, Bluetooth, Near Field Communication (NFC) or the like. For example, referring to FIG. 2, the activity device 30 may be an external personal electronic device 33, such as a tablet or smartphone that is not physically connected to the toy 10, but communicates with the control unit through the wireless transceiver. The external personal electronic device 33 may contain an app that provides activities for the child, and signals the control unit when an activity or a milestone has occurred within the activity and when a reward is to be released. Whether the activity device 30 is a dedicated tablet computer 32 or an external personal electronic device 33, the activity device is preferably configured as shown in FIG. 8. In particular, the activity device may have a CPU 36 in communication with the touchscreen display 34 that provides the functionality described herein, and also preferably has a microphone 37 and speaker 38 to facilitate audible communication with the child. In addition, the activity device 30 may have a wireless transceiver 39 for communicating with the wireless transceiver 72 of the control unit 70, to communicate milestones to the control unit 70 in the absence of a hardwired connection thereto, and to also signal other prompts back to the activity device 30 when necessary for carrying out the functionality described herein.

Figure 3:
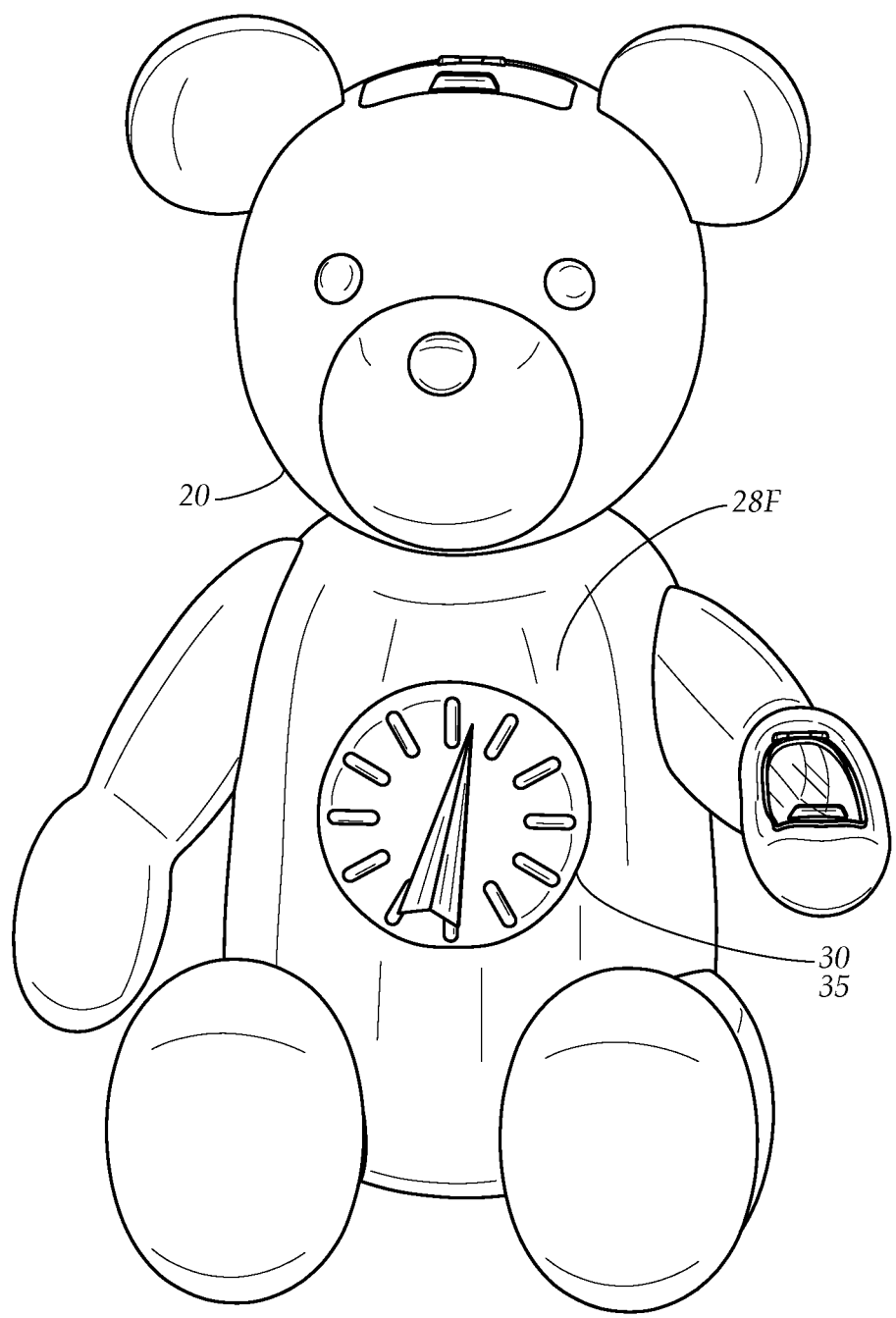
FIG. 3 is a diagrammatic perspective view, illustrating a further embodiment of a delayed gratification encouragement toy, having a further example of a child activity provided thereby.

Referring to FIG. 3, in an alternate embodiment, the activity device 30 need not be a touchscreen-based virtual activity, but may also be a mechanical activity 35, provided on the torso front surface 28F of the housing 20, that allows the child to physically complete a task or perform a function in order to reach a milestone and earn the reward. Note that numerous variations and configurations are possible for the mechanical activity 35, and for the activity device 30 in general.

Figure 5A:
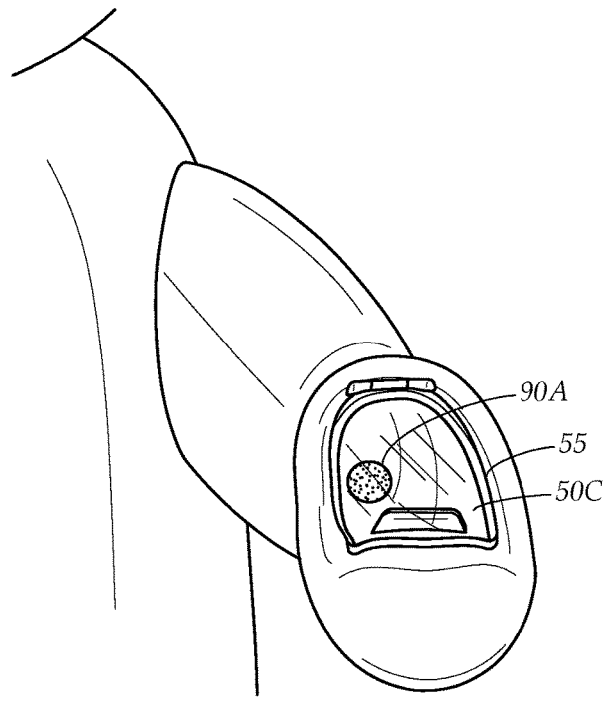
FIG. 5A is a diagrammatic perspective view, illustrating an example of a receiving cup in accordance with the present disclosure, wherein a first reward has been dispensed thereinto such that it is visible to the child.
Figure 5B:
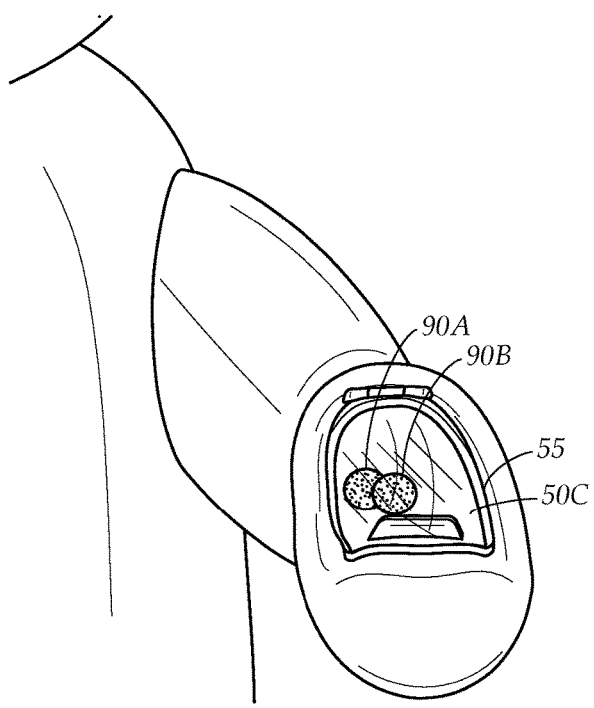
FIG. 5B is a diagrammatic perspective view, similar to FIG. 5A, except wherein a second reward has been dispensed for the child who delays receipt of the first reward.
Figure 6:
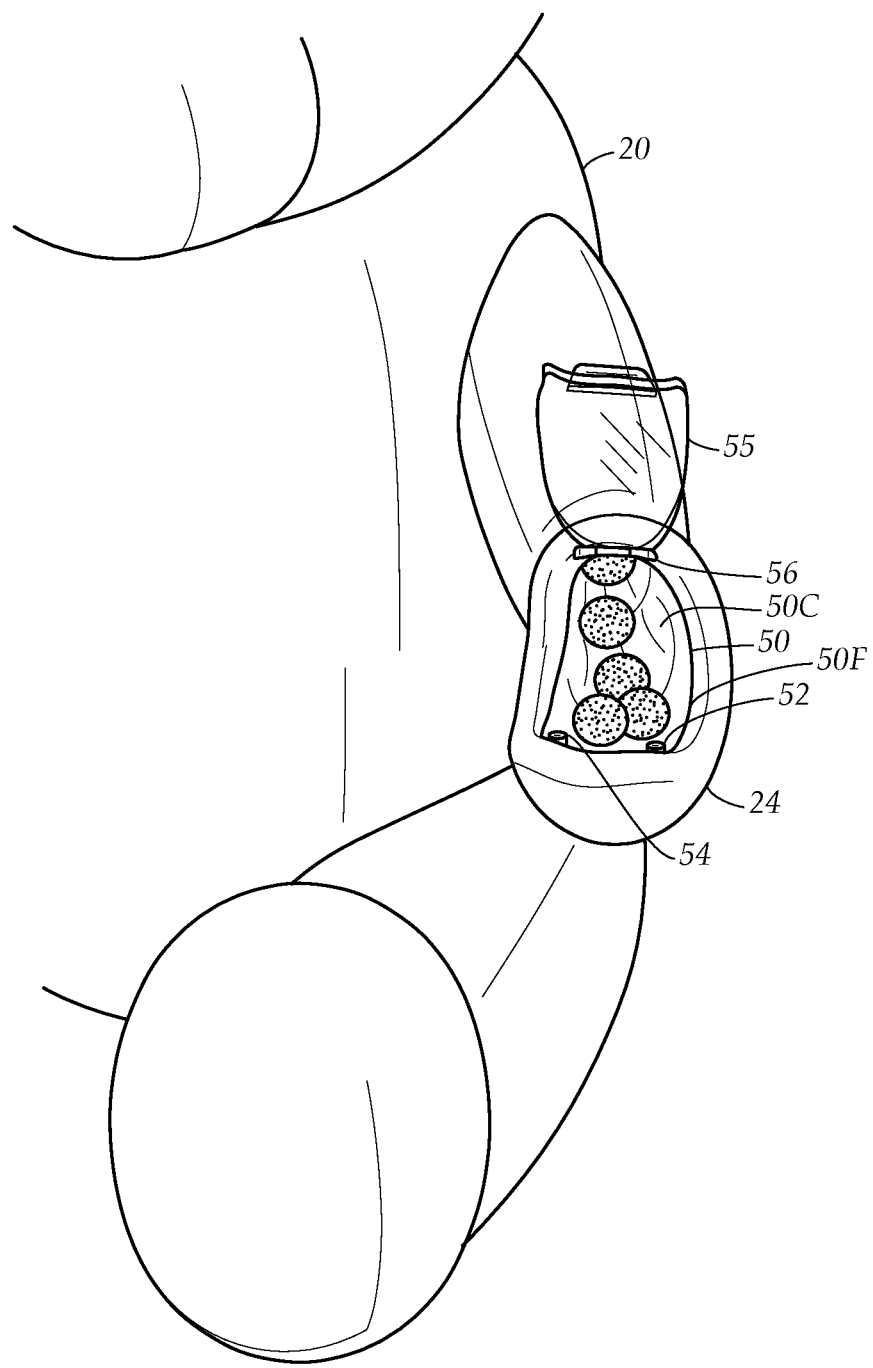
FIG. 6 is a diagrammatic perspective view, wherein the receiving cup door has been opened for removal of the rewards previously dispensed.

Referring again to FIG. 8, the control unit 70 is in communication with the release device 62 of the dispensing mechanism 60 to signal the dispensing mechanism 60 to release a reward. The receiving cup 50 may have a door sensor 52 and/or a door lock 54 in communication with the control unit 70. As will be discussed in further detail hereinbelow, the door sensor 52 allows the control unit 70 to determine when the child has retrieved a reward from the release cup 50 and the door lock 54 allows the control unit 70 to selectively prevent or allow access to the receiving cup 50. In particular, referring to FIG. 6, the receiving cup 50 includes a door 55 that is connected by a hinge 56 to the housing 20. In particular, in this embodiment where the housing 20 is configured as a bear, and wherein the receiving cup 50 is located within one of the upper paws 24 of the housing 20, the receiving cup 50 has a front opening 50F in said upper paw 24 that provides access to a receiving cup cavity 50C. The door 55 has an open position as shown, and a closed position as indicated in FIGS. 5A and 5B. The front opening 50F is thereby selectively closed by the door 55 to prevent access to the receiving cup cavity 50C. The door 55 is made of plastic and is transparent so that the child can see into the receiving cup cavity 50C through the door 55. As discussed previously in the discussion of FIG. 8, to regulate access to receiving cup cavity 50C, the receiving cup 50 may employ the door sensor 52 to detect when the door 55 is in the open position to determine when the child has retrieved a reward from the release cup 50, and may employ the door lock 54 to selectively hold the door 55 in the closed position to prevent access to the receiving cup 50 or allow the door to open to permit access to the release cup 50.

Figure 9:
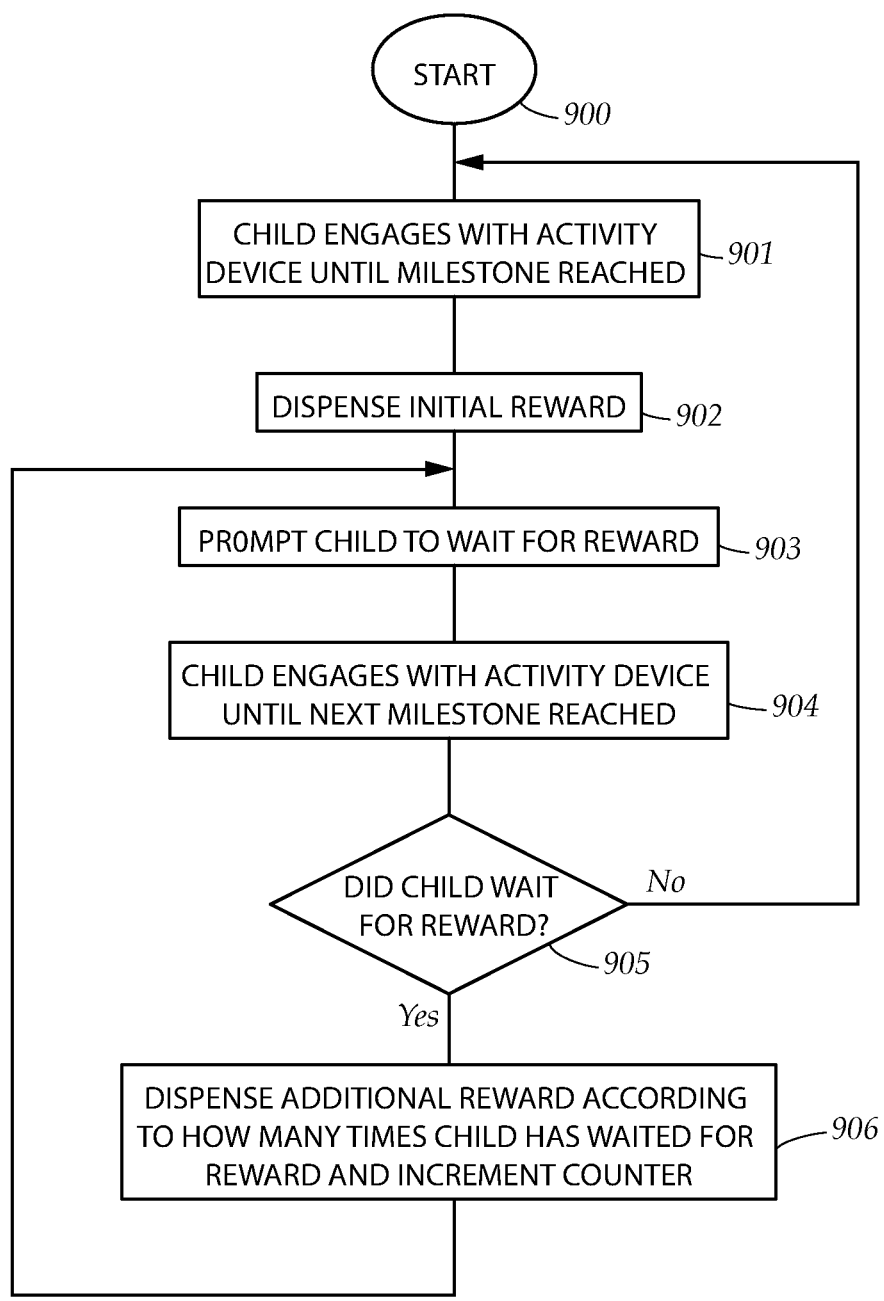
FIG. 9 is a flow diagram, illustrating basic functional operation of the delayed gratification encouragement toy.

Basic functionality and operation of the delayed gratification encouragement toy are illustrated in FIG. 9. After starting use of the toy 900, the child engages with the activity device until a milestone is reached 901, then an initial reward is dispensed into the receiving cup 902. Referring momentarily to FIG. 5A, an initial reward 90A is dispensed into the receiving cup 50 and can be seen through the door 55. Returning to FIG. 9, the child is then prompted to wait before retrieving the reward to receive an additional reward 903. After a time period of continued engagement with the activity device such that the next milestone is reached 904, the toy/system considers whether the child waited for the reward 905. If the child did not wait, the child may continue to engage with the activity device at block 901. If the child did wait to retrieve the reward an additional reward is dispensed into the dispensing cup and a count of how many times the child has delayed receiving the reward is incremented 906. Referring momentarily to FIG. 5B, an additional reward 90B is dispensed into the receiving cup 50 and can be seen through the door 55 along with the initial reward 90A that has not yet been retrieved. Returning to FIG. 9, then the child is prompted to continue to wait at block 903 and may continue to engage with the activity device until the next milestone is reached 904. The additional reward that is dispensed may be increased according to how many times the child has continued to engage with the activity device and reached a milestone without retrieving the reward. Advantageously, it should be extremely clear to the child while using the toy that the amount of reward they are receiving is increasing and will increase tremendously each time they delay retrieving the reward. To accomplish this, for example, the reward dispensed might double at each milestone that the child delays retrieval. To accomplish this significant growth in reward dispensing, advantageously the reward cup should be large enough to accumulate significant reward items, and the reward items themselves should be relatively small.

Note that the above description presumes that the child complies or agrees to delay retrieval of the reward. In actuality the delayed retrieval of the reward can be accomplished in at least two ways: by preventing early retrieval or by detecting early retrieval. These two ways can be implemented in accordance with whether the door sensor or door lock is employed by the toy to delay retrieval. In particular, with the door sensor employed, it is continuously up to the child to delay retrieval by not opening the door, and early retrieval is detected by the system. With the door lock employed, the child may be asked at each milestone if they can wait until the next milestone. Preferably this occurs by a prompt on the touchscreen, and acceptance of a response using the touchscreen. However the prompt may be spoken and the acceptance or denial indicated verbally using the microphone and speaker. If the child does agree to wait, the door is locked until the next milestone is reached. Each of these methodologies provides its own valuable lessons to the child. Of note, however, is that when the child agrees to wait and the door is locked, the additional reward may be dispensed into the receiving cup immediately, so that the child can immediately see what they have earned by agreeing to wait. Since the child can immediately see the additional reward they earned within the receiving cup upon their agreement, the result of their agreement is tangible to them. Note that this tangibility can be created in other ways, including virtually—even when the door sensor is employed—such as by displaying their impending additional reward on the display as the child continues engagement without retrieving the reward.

Figure 10:
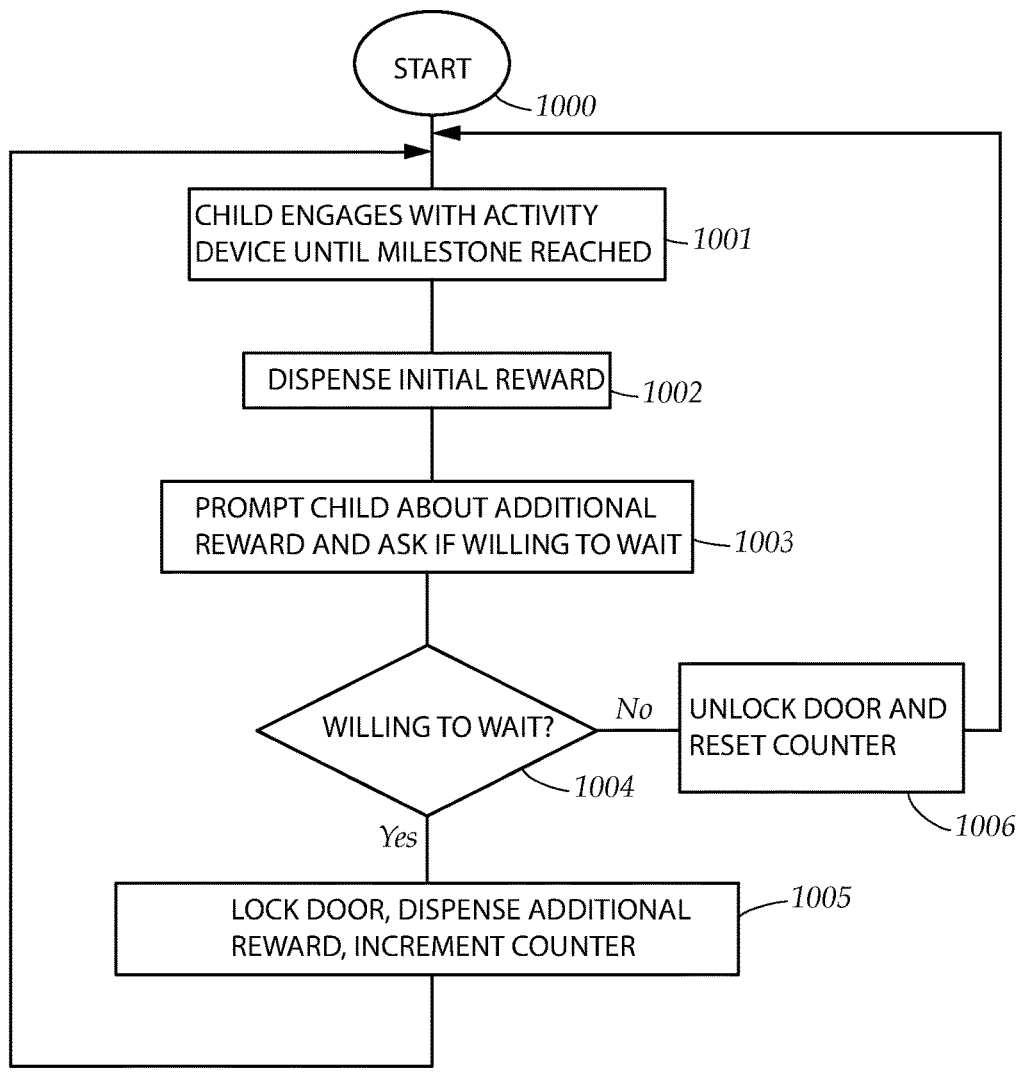
FIG. 10 is a flow diagram, illustrating an additional embodiment of operation of the delayed gratification encouragement toy, employing a door lock on the door of the receiving cup.

FIG. 10 illustrates a method in accordance with the present disclosure that involves locking the door to the retrieval cup. In particular, after starting use of the toy 1000, the child engages with the activity device until a milestone is reached 1001. When the milestone is reached, an initial reward is dispensed into the receiving cup 1002, and the child is prompted that if they will wait they will receive an additional reward and is asked if they are willing to wait 1003. The child may indicate willingness to delay receiving the reward using the touchscreen, verbally, or through any other suitable means. If the child is willing to wait at block 1004, the door to the receiving cup is locked, an additional reward is dispensed into the receiving cup according to how may times the child has agreed to delay receiving the reward, and a count of how many times the child has delayed receiving the reward is incremented 1005. If the child is not willing to wait at block 1004, the door is unlocked so that the child can retrieve the reward, and the counter is reset 1006. In particular, resetting the system means resetting to zero the count of how many times the child has delayed receiving the reward. At this point the child may be prompted that they can now take the reward from the receiving cup but next time, if they wait, they will receive additional rewards.

Figure 11:
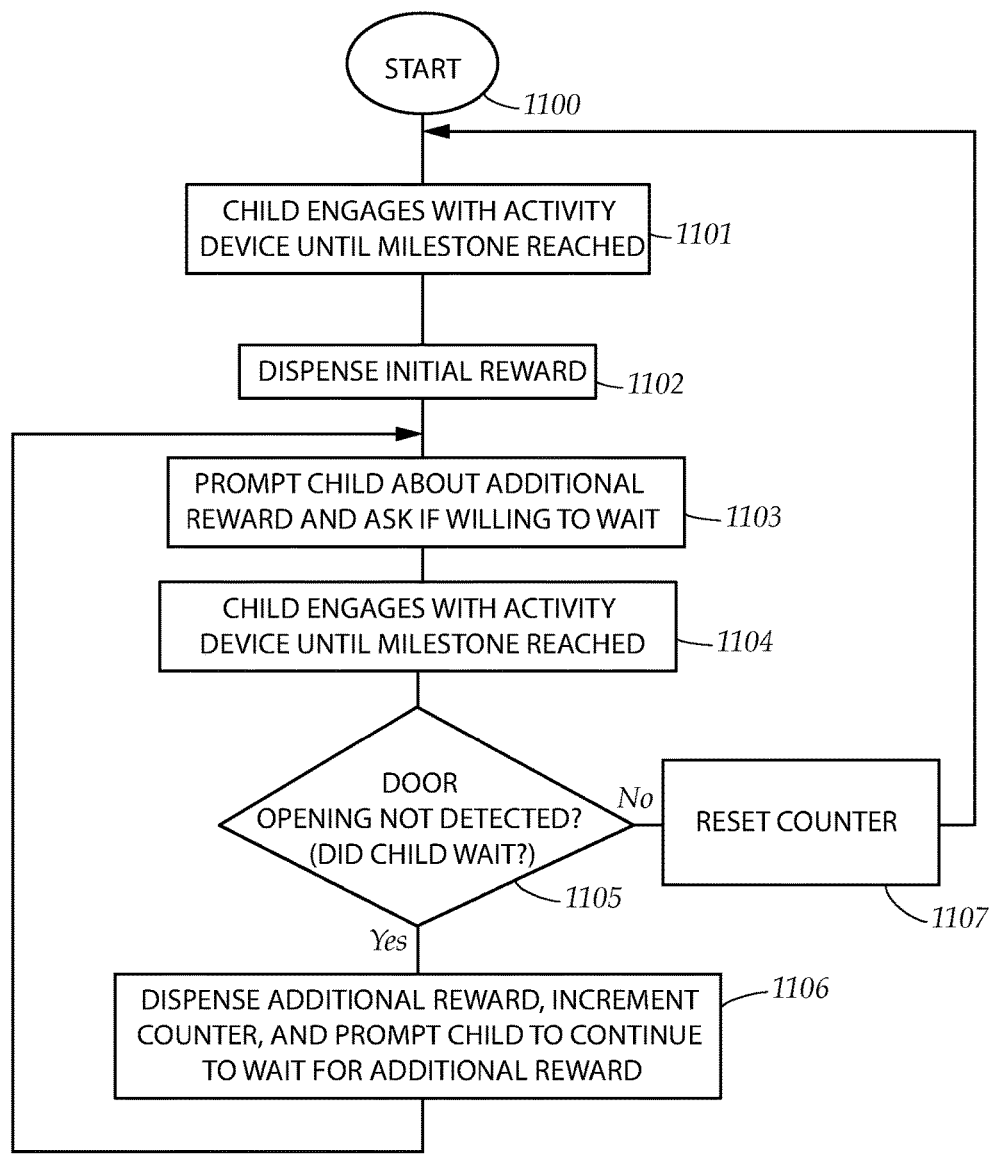
FIG. 11 is a flow diagram, illustrating an additional embodiment of operation of the delayed gratification encouragement toy, employing a door sensor on the door of the receiving cup.

FIG. 11 illustrates a method in accordance with the present disclosure that involves using the door sensor to determine when the child has retrieved the reward, such that it is always the child's choice when to retrieve the reward from the receiving cup. In particular, after starting use of the toy 1100 the child engages with the activity device until a milestone is reached 1101. When the milestone is reached, an initial reward is dispensed 1102, and the child is prompted that they will be receiving an additional reward if they wait until the next milestone is reached 1103. The child may indicate willingness to delay receiving the reward using the touchscreen, verbally, or through any other suitable means. The child then engages with the touchscreen until the next milestone is reached 1104. The toy determines whether the child waited until this next milestone to retrieve the reward by determining if the door to the receiving cup was opened since the previous milestone 1105. If the door was not opened and so the child did wait, an additional reward is dispensed according to how may times the child has delayed receiving the reward, a count of how many times the child has delayed receiving the reward is incremented, and the child is prompted to continue to wait 1006. If the door was opened and the child did not wait at block 1105, the counter is reset 1007. In addition, the child may be gently prompted that they did not wait and next time, if they are willing to wait, they will receive additional rewards, and the child may again engage with the activity device at block 1101.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a delayed gratification encouragement toy. The disclosure is illustrated by example in the drawing figures, and throughout the written description. It should be understood that numerous variations are possible, while adhering to the inventive concept. Such variations are contemplated as being a part of the present disclosure.

What is claimed is:
1. A delayed gratification encouragement toy, for use by a child along with a plurality of bite sized edible snacks, comprising:
 a housing, provided as a plush toy;

an activity device, for providing an activity that has a milestone event that may be attained when the child engages with the activity device;

a reward reservoir for selectively holding the snacks;

a receiving cup having a cup interior for receiving the snacks and a door that allows access to the interior, and having a door sensor for determining when the door is opened;

a dispensing device for selectively dispensing the snacks from the reward reservoir to the receiving cup;

a control unit, for causing the dispensing device to release one of the snacks to the receiving cup as an initial reward when the activity device indicates a milestone event has occurred, and for causing an additional reward to be dispensed to the receiving cup if the child did not retreive the initial reward from the dispensing cup when the activity device reaches a next milestone event.

2. The delayed gratification encouragement toy as described in claim 1, wherein the activity device is a tablet computer having a touchscreen display and running software that allows the child to engage in the activity using the touchscreen display, the touchscreen display also notifying the child that an additional reward will be provided if the child continues engaging with the activity for a predetermined period after the milestone event.

3. The delayed gratification encouragement toy as described in claim 2, further comprising a door sensor for determining if the door is open and wherein the control unit determines whether the child did not retrieve the initial reward by determining if the door has been opened.

4. The delayed gratification encouragement toy as recited in claim 3, wherein the housing is configured as a bear, having a top, a bottom, a pair of lower paws, a pair of upper paws, a face, and a torso having a torso front; wherein the reward reservoir is located at the top and wherein the receiving cup is located in one of the upper paws; and wherein the touchscreen display is provided on the torso front.

5. The delayed gratification encouragement toy as recited in claim 3, further comprising a wireless transceiver in communication with the control unit for allowing the tablet computer to communicate that a milestone event has occurred to the control unit without a physical connection.

6. The delayed gratification encouragement toy as described in claim 2, further comprising a door lock connected to the control unit for selectively locking the door to the receiving cup and preventing access to the cup interior, wherein the control unit prompts the child to wait before retrieving the reward using the touchscreen display and locks the door using the door lock if the child agrees to wait using the touchscreen display.

7. The delayed gratification encouragement toy as described in claim 6, wherein the control unit tracks how many times the child has agreed to wait before receiving the reward and when providing the additional reward increases the quantity of snack items dispensed according to how many times the child has agreed to wait before receiving the reward.

8. The delayed gratification encouragement toy as recited in claim 7, wherein the door is transparent so that the snack items inside the cup interior can be seen through the door.

9. The delayed gratification encouragement toy as recited in claim 8, wherein the housing is configured as a bear, having a top, a bottom, a pair of lower paws, a pair of upper paws, a face, and a torso having a torso front; wherein the reward reservoir is located at the top and wherein the receiving cup is located in one of the upper paws; and wherein the touchscreen display is provided on the torso front.

10. A delayed gratification encouragement method, using a toy having a housing having a reservoir for holding a plurality of snack items, a receiving cup, and an activity device, for use by a child, comprising the steps of:

a) engaging with the activity device by the child until a milestone is reached;

b) dispensing an initial reward of at least one snack item from the reservoir to the receiving cup;

c) engaging with the activity device until a next milestone is reached; and d) dispensing an additional reward if the child has not retrieved the initial reward before said next milestone is reached.

11. The delayed gratification encouragement method as recited in claim 10, further comprising repeating step (c) at least once and wherein the step of dispensing an additional reward further comprises increasing the number of snack items in the additional reward for the number of times step (c) is repeated.

12. The delayed gratification encouragement method as recited in claim 11, wherein the receiving cup has a door and a door lock; and wherein the step of dispensing an additional reward if the child has not retrieved the initial reward further comprise asking the child if willing to wait and locking the door if the child is willing to wait, and unlocking the door if the child is unwilling to wait.

13. The delayed gratification encouragement method as recited in claim 12, wherein the step of locking the door if the child is willing to wait further comprises dispensing immediately the additional reward.

14. The delayed gratification encouragement method as recited in claim 12, wherein the activity device has a touchscreen display and wherein the step of asking the child if willing to wait further comprises prompting the child on the touchscreen display and receiving an answer using the touchscreen display.

15. The delayed gratification encouragement method as recited in claim 11, wherein the receiving cup has a door and a door sensor, and wherein the step of dispensing an additional reward if the child has not retrieved the initial reward further comprises determining if the door is open by the door sensor.

16. The delayed gratification encouragement method as recited in claim 15, wherein the step of dispensing an additional reward if the child has not retrieved the initial reward further comprises prompting the child that they will receive the additional reward if the child waits until the next milestone is reached.

* * * * *